United States Patent
Frazier et al.

(10) Patent No.: US 6,898,638 B2
(45) Date of Patent: May 24, 2005

(54) METHOD AND APPARATUS FOR GROUPING DATA FOR TRANSFER ACCORDING TO RECIPIENT BUFFER SIZE

(75) Inventors: Giles Roger Frazier, Austin, TX (US); Gregory Francis Pfister, Austin, TX (US); Renato John Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 09/758,737

(22) Filed: Jan. 11, 2001

(65) Prior Publication Data

US 2002/0091852 A1 Jul. 11, 2002

(51) Int. Cl.$^7$ .............................................. G06F 13/00
(52) U.S. Cl. ........................................................ 709/232
(58) Field of Search ............................. 709/212, 213, 709/228, 235, 217, 218, 219, 220, 227, 230, 231, 232; 711/100, 117, 154, 163; 710/15, 17, 29, 33, 36, 52, 57

(56) References Cited

U.S. PATENT DOCUMENTS 6,738,821 B1 * 5/2004 Wilson et al. .............. 709/230

* cited by examiner

Primary Examiner—Robert B. Harrell
(74) Attorney, Agent, or Firm—Duke W. Yee; Mark E. McBurney; Lisa L. B. Yociss

(57) ABSTRACT

A method, apparatus, and computer implemented instructions for transferring data. A request is sent by a requester to a responder. The request includes an amount of available processing space at the requestor. When the request is received from the responder, data is identified using the request. The data is placed into a plurality of subsequences of data packets for transfer to the requester, wherein each packet within the set of subsequences hold data in amount less than or equal to the amount of available space. These subsequences are then sent to the requestor one subsequence at a time. A new subsequence is sent each time the available processing space at the requester becomes free to process data from another subsequence. The requestor receives a subsequence from the plurality of subsequences in response to the request each time the amount of available processing space is free, wherein data within each of the set of subsequences fits within the amount of available processing space.

38 Claims, 6 Drawing Sheets

METHOD AND APPARATUS FOR GROUPING DATA FOR TRANSFER ACCORDING TO RECIPIENT BUFFER SIZE

BACKGROUND OF THE INVENTION

1. Technical Field

The present invention relates generally to an improved network data processing system, and in particular to a method and apparatus for managing a network data processing system. Still more particularly, the present invention provides a method and apparatus for transferring data using a set of data packets.

2. Description of Related Art

In a system area network (SAN), the hardware provides a message passing mechanism which can be used for Input/Output devices (I/O) and interprocess communications between general computing nodes (IPC). Processes executing on devices access SAN message passing hardware by posting send/receive messages to send/receive work queues on a SAN channel adapter (CA). These processes also are referred to as "consumers". The send/receive work queues (WQ) are assigned to a consumer as a queue pair (QP). The messages can be sent over five different transport types: Reliable Connected (RC), Reliable datagram (RD), Unreliable Connected (UC), Unreliable Datagram (UD), and Raw Datagram (RawD). Consumers retrieve the results of these messages from a completion queue (CQ) through SAN send and receive work completions (WC). The source channel adapter takes care of segmenting outbound messages and sending them to the destination. The destination channel adapter takes care of reassembling inbound messages and placing them in the memory space designated by the destination's consumer. Two channel adapter types are present, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

Network management operations, especially during configuration, are often performed by relatively simple routines which have limited information transfer and storage capabilities. For this reason, the unreliable datagram message type is used, and the datagram length is limited to a fixed small value. Many management operations can be accomplished by the transfer of a single datagram or pair of request/response datagrams. When errors occur in these simple operations, the entire operation can be repeated without incurring excessive overhead. Other management operations require the transfer of large amounts of data, which cannot be contained in a single datagram. These operations require a means of correlating related datagrams, recognizing lost datagrams, and recovering lost datagrams. Also, in network management "Get" operations in which a requester requests data from a database, the requester does not know how much data will be returned; a scheme is needed for a requester to set an upper bound on the amount of data returned, and to continue the returning of more data for the request if additional data is available. Finally, in network management "Set" operations in which a large amount of data is being sent to a recipient, the recipient of the data may be unprepared to receive all the data initially.

Therefore, it would be advantageous to have an improved method and apparatus for limiting the amount of initial data sent and which provides the recipient the means to request more data when it is prepared to receive the data.

SUMMARY OF THE INVENTION

The present invention provides a method, apparatus, and computer implemented instructions for transferring data in response to a request, and for transferring data to a recipient without having received a prior request. When data is transferred in response to a request, the request is sent by a requestor to a responder. The request includes an amount of available processing space at the requester. When the request is received from the responder, data is identified using the request. The data is placed into a plurality of data packets for transfer to the requestor, wherein each packet within the set of packets holds a fixed amount of data. Packets are grouped into subsequences of packets, each of which holds data in amount less than or equal to the amount of available space. These subsequences are then sent to the requester. A new subsequence is sent each time the available processing space at the requestor becomes free to process data from another subsequence. The requester receives a subsequence of data packets in response to the request each time the amount of available processing space is free, wherein data within each subsequence of data packets fits within the amount of available processing space.

When data is sent to a recipient without a prior request, the sender first sends a subsequence of data packets, which holds data up to a default amount of data. The sender then sends additional subsequences of data each time an amount of processing space is free at the receiver.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
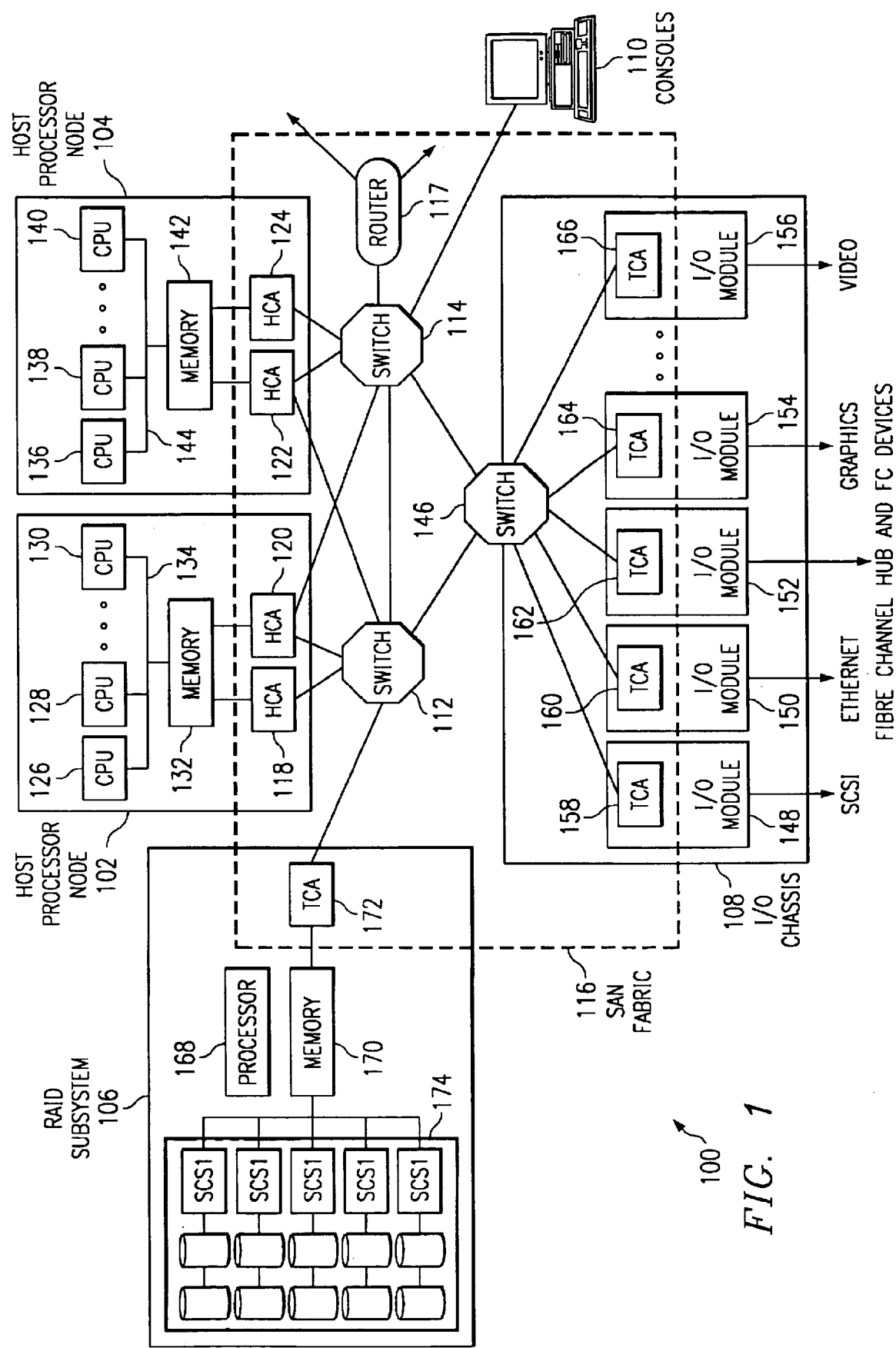
FIG. 1 is a diagram of a network global change computing system in accordance with a preferred embodiment of the present invention.

With reference now to the figures and in particular with reference to FIG. 1, a diagram of a network global change computing system is illustrated in accordance with a preferred embodiment of the present invention. The distributed computer system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet. SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in a distributed computing system, such as SAN 100.

A message, as used herein, is an application-defined unit of data exchange, which is a primitive unit of communication between cooperating processes. A packet is one unit of data encapsulated by a networking protocol headers and/or trailer. The headers generally provide control and routing information for directing the frame through SAN. The trailer generally contains control and cyclic redundancy check (CRC) data for ensuring packets are not delivered with corrupted contents. SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as endnodes, switches, or routers. Example of suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114. In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications.

As indicated in FIG. 1, router 116 is coupled to wide area network (WAN) and/or local area network (LAN) connections to other hosts or other routers.

The I/O chassis 108 in FIG. 1 include an I/O switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166. In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in distributed computer system. With an I/O adapter attached to the SAN 100, the resulting I/O adapter node has substantially the same communication capability as any host processor node in SAN 100.

Figure 2:
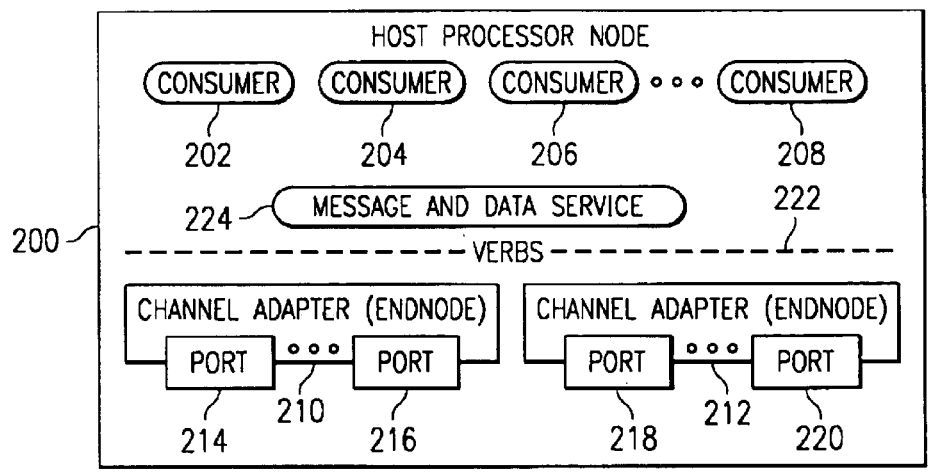
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1.

In this example, host processor node 200 shown in FIG. 2 includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters. Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host.

Additionally, host processor node 200 includes a message and data service 224, which is a higher level interface than the verb layer and is used to process messages and data received through channel adapter 210 and channel adapter 212. Message and data service 224 provides an interface to consumers 202–208 to process messages and other data.

Figure 3:
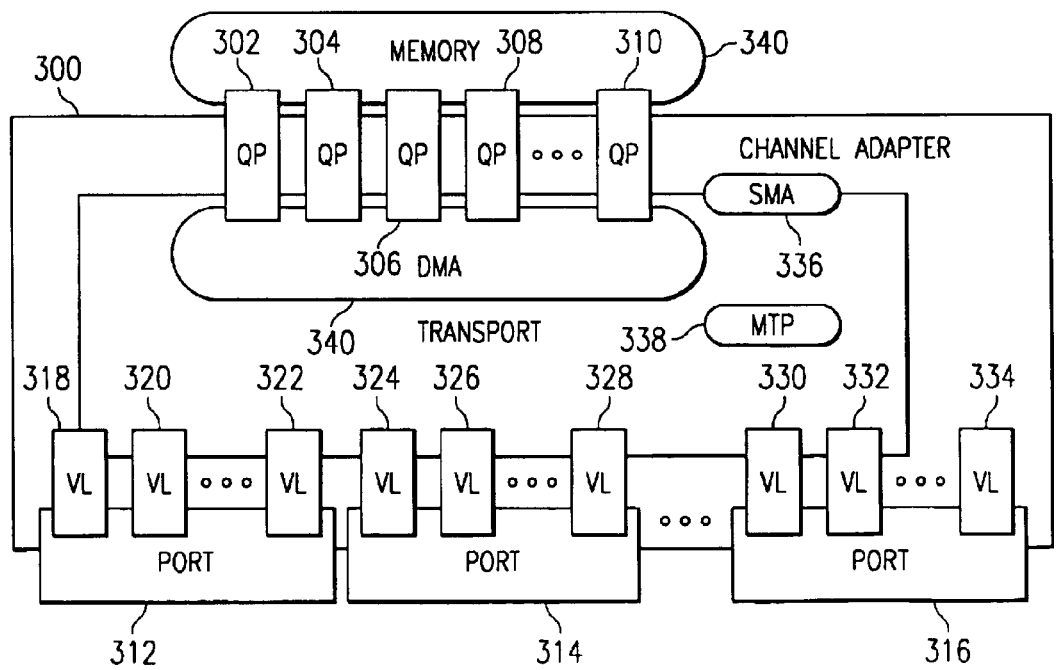
FIG. 3 is a diagram of a host channel adapter in accordance with a preferred embodiment of the present invention.

With reference now to FIG. 3, a diagram of a host channel adapter is depicted in accordance with a preferred embodiment of the present invention. Host channel adapter 300 shown in FIG. 3 includes a set of queue pairs (QPs) 302–310, which are used to transfer messages to the host channel adapter ports 312–316.

Buffering of data to host channel adapter ports 312–316 is channeled through virtual lanes (VL) 318–334 where each VL has its own flow control. Subnet manager configures channel adapters with the local addresses for each physical port, i.e., the port's LID. Subnet manager agent (SMA) 336 is the entity that communicates with the subnet manager for the purpose of configuring the channel adapter. Memory translation and protection (MTP) 338 is a mechanism that translates virtual addresses to physical addresses and to validate access rights. Direct memory access (DMA) 340 provides for direct memory access operations using memory 340 with respect to queue pairs 302–310.

A single channel adapter, such as the host channel adapter 300 shown in FIG. 3, can support thousands of queue pairs. By contrast, a target channel adapter in an I/O adapter typically supports a much smaller number of queue pairs.

Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 4:
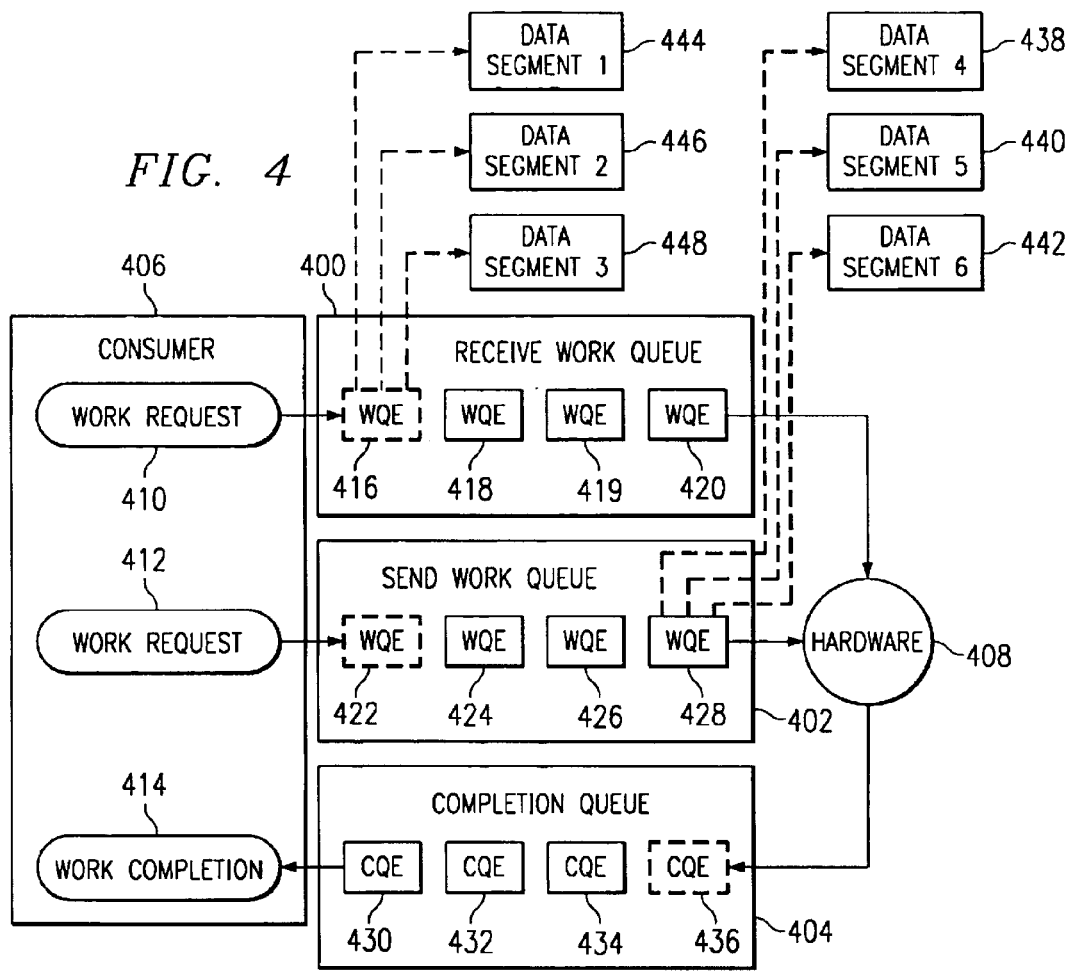
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 406 are eventually sent to hardware 408. In this example, consumer 406 generates work requests 410 and 412 and receives work completion 414. As shown in FIG. 4, work requests placed onto a work queue are referred to as work queue elements (WQEs). Send work queue 402 contains work queue elements (WQEs) 422–428, describing data to be transmitted on the SAN fabric. Receive work queue 400 contains work queue elements (WQEs) 416–420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses which have been bound to a previously registered region.

The RDMA Read work request reads a virtually contiguous memory space on a remote endnode and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports four types of transport services.

Reliable and Unreliable connected services associate a local queue pair with one and only one remote queue pair. Connected services require a process to create a queue pair for each process, which is to communicate over the SAN fabric. Thus, if each of N host processor nodes contain P processes, and all P processes on each node wish to communicate with all the processes on all the other nodes, each host processor node requires $P^2 \times (N-1)$ queue pairs. Moreover, a process can connect a queue pair to another queue pair on the same host channel adapter.

Reliable datagram service associates a local end-end (EE) context with one and only one remote end-end context. The reliable datagram service permits a client process of one queue pair to communicate with any other queue pair on any other remote node. At a receive work queue, the reliable datagram service permits incoming messages from any send work queue on any other remote node. The reliable datagram service greatly improves scalability because the reliable datagram service is connectionless. Therefore, an endnode with a fixed number of queue pairs can communicate with far more processes and endnodes with a reliable datagram service than with a reliable connection transport service. For example, if each of N host processor nodes contain P processes, and all P processes on each node wish to communicate with all the processes on all the other nodes, the reliable connection service requires $P^2 \times (N-1)$ queue pairs on each node. By comparison, the connectionless reliable datagram service only requires P queue pairs+(N−1) EE contexts on each node for exactly the same communications.

Figure 5:
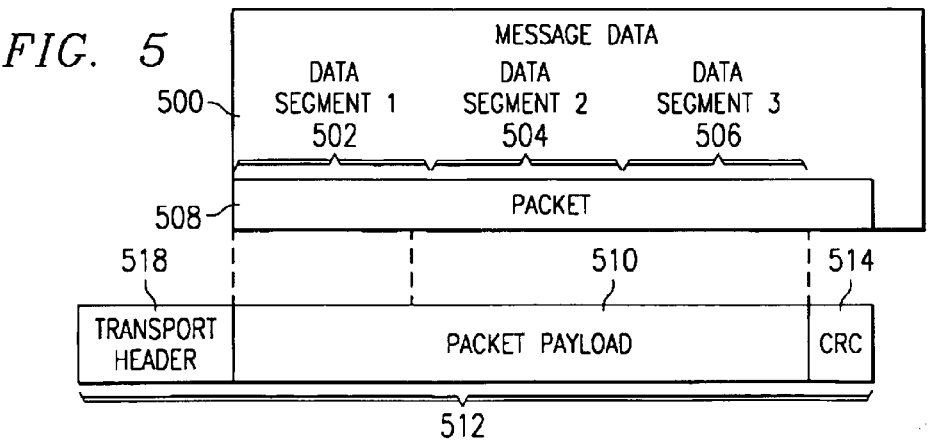
FIG. 5 is an illustration of a data packet in accordance with a preferred embodiment of the present invention.

The unreliable datagram service is connectionless. The unreliable datagram service is employed by management applications to discover and integrate new switches, routers, and endnodes into a given distributed computer system. The unreliable datagram service does not provide the reliability guarantees of the reliable connection service and the reliable datagram service. The unreliable datagram service accordingly operates with less state information maintained at each endnode. Turning next to FIG. 5, an illustration of a data packet is depicted in accordance with a preferred embodiment of the present invention. Message data 500 contains data segment 1 502, data segment 2 504, and data segment 3 506, which are similar to the data segments illustrated in FIG. 4. In this example, these data segments form a packet 508, which is placed into packet payload 510 within data packet 512. Additionally, data packet 512 contains CRC 514, which is used for error checking. Additionally, routing header 516 and transport 518 are present in data packet 512. Routing header 516 is used to identify source and destination ports for data packet 512. Transport header 518 in this example specifies the destination queue pair for data packet 512.

Additionally, transport header 518 also provides information such as the operation code, packet sequence number, and partition for data packet 512. The operating code identifies whether the packet is the first, last, intermediate, or only packet of a message. The operation code also specifies whether the operation is a send RDMA write, read, or atomic. The packet sequence number is initialized when communications is established and increments each time a queue pair creates a new packet. Ports of an endnode may be configured to be members of one or more possibly overlapping sets called partitions.

If a reliable transport service is employed, when a request packet reaches its destination endnode, acknowledgment packets are used by the destination endnode to let the request packet sender know the request packet was validated and accepted at the destination. Acknowledgment packets acknowledge one or more valid and accepted request packets. The requester can have multiple outstanding request packets before it receives any acknowledgments. In one embodiment, the number of multiple outstanding messages is determined when a QP is created.

The present invention provides a mechanism for managing transfer of data between a requester, who requests data, and a responder, who sends the requested data back to the requestor. The present invention also provides for managing transfer of data between a sender, and a recipient who has not previously sent a request for the data. These mechanisms are implemented through processes within the requester and responder, or the sender and recipient, as well as by the placement of fields within data packets to provide for reliable data transfers using unreliable datagrams called management datagrams (MADs). The mechanism, in which a requester requests data, involves the requestor sending a query or a request for data. In this case, the response size, the amount of data, is unknown. This request includes an amount of buffer space available at the requestor for processing data returned in the response. The responder replies by sending data packets containing data responsive to the request. In these examples, the data is contained in a sequence of MADs. The amount of data sent in the sequence of MADs is no more than the amount of buffer space available at the requestor. A series of MADs is sent in this fashion rather than sending all of the data in a single sequence of data packets. These sequences of data packets are also referred to as subsequences.

After a subsequence is sent, the responder waits for a reply indicating a correct reception of the previous subsequence and availability of the buffer space prior to sending the next subsequence. If an error has occurred, the subsequence may be resent, rather than resending the entire response.

Further, the amount of buffer space may change and this change in the amount of available buffer space may be reflected in the reply from the requester. Also, the last data packet may not be contain data up to the amount of available buffer space. In other words, this data packet may contain less data than the amount of available buffer space. In such a case, a fragment flag may be set within the data packet to indicate how full the data packet is, as well as identifying the current packet as the last data packet sent containing data responsive to the request.

Figure 6:
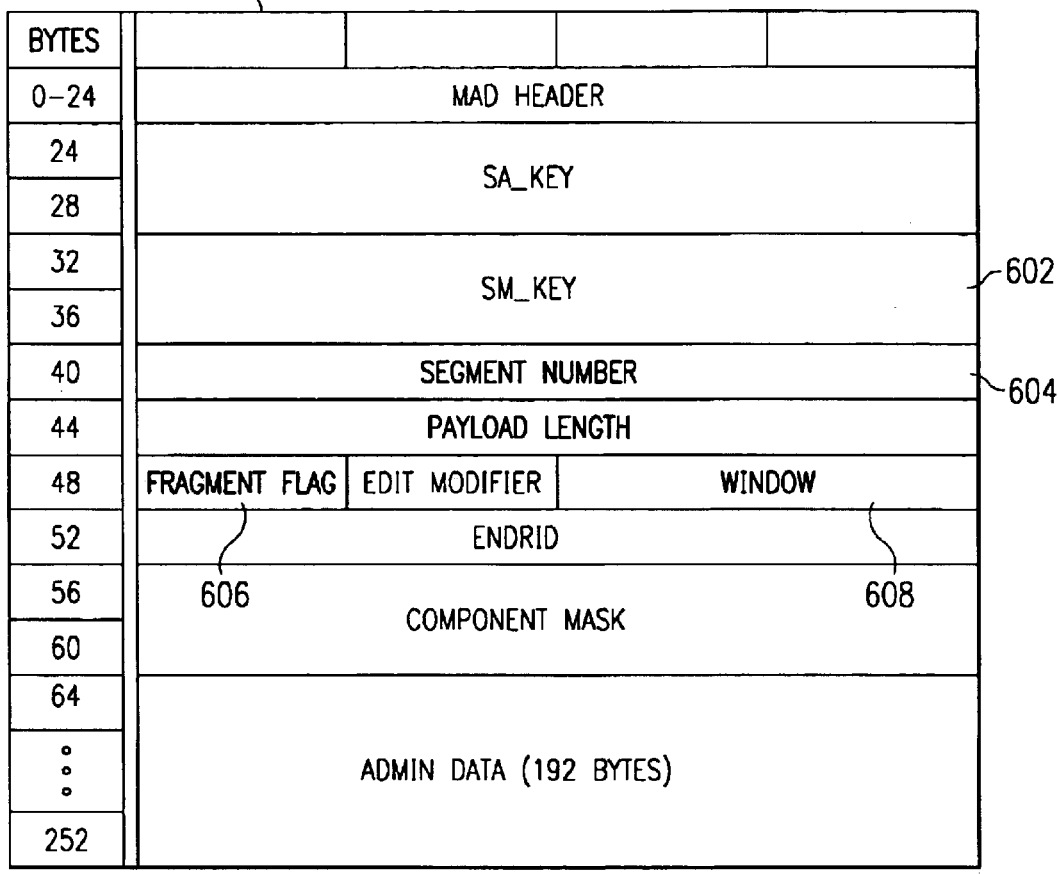
FIG. 6, is a diagram of a management datagram data packet in accordance with a preferred embodiment of the present invention.

Turning next to FIG. 6, the diagram of a MAD is depicted in accordance with a preferred embodiment of the present invention. MAD 600 is an example of the packet payload field of a data packet, such as, data packet payload field 510 in FIG. 5. Segment number field 602, payload length field 604, fragment flag field 606 and window parameter field 608 are additional fields used in providing reliable data transfer between a requestor and a responder. In these examples, the requestor may be host processor node 102 in FIG. 1, while the responder may be redundant array independent disk (RAID) subsystem node 106 in FIG. 1.

Segment number field 602 identifies the relative position of the packet within the request or response. For example, a particular packet may be a first packet in a series of packets to be processed. Alternatively, the packet may be the last packet or a packet somewhere in between with respect to data located in the other packets. Segment number field 602 identifies the relative position of the data in the packet so that this data may be reassembled with the data from the other data packets in a correct order.

In these examples, payload length field 604 is valid in the first packet of a multipacket request and multipacket response. Payload length field 604 specifies the expected length of the entire multipacket request or response. Payload length field also is valid in the final packet of a multipacket send operation or a response to specify how much data is contained the final packet of the operation. It is necessary to include the payload length in the final packet of a multipacket operation in order to specify the number of valid data bytes in the final packet in case the actual amount of data sent does not equal the expected amount of data as indicated in the payload length field of the first packet of the operation. Fragment flag field 606 specifies whether the packet is (1) the first or last packet of the request or response, (2) an acknowledgment packet acknowledging the receipt of packets, (3) a resend-request packet requesting retransmission of packets, or (4) a packet requesting the timers for the transaction to be reset.

Window parameter field 608 specifies the amount of buffer space available at the recipient for subsequent subsequences. The window parameter field is valid on a request packet or on an acknowledgement packet.

Figure 7:
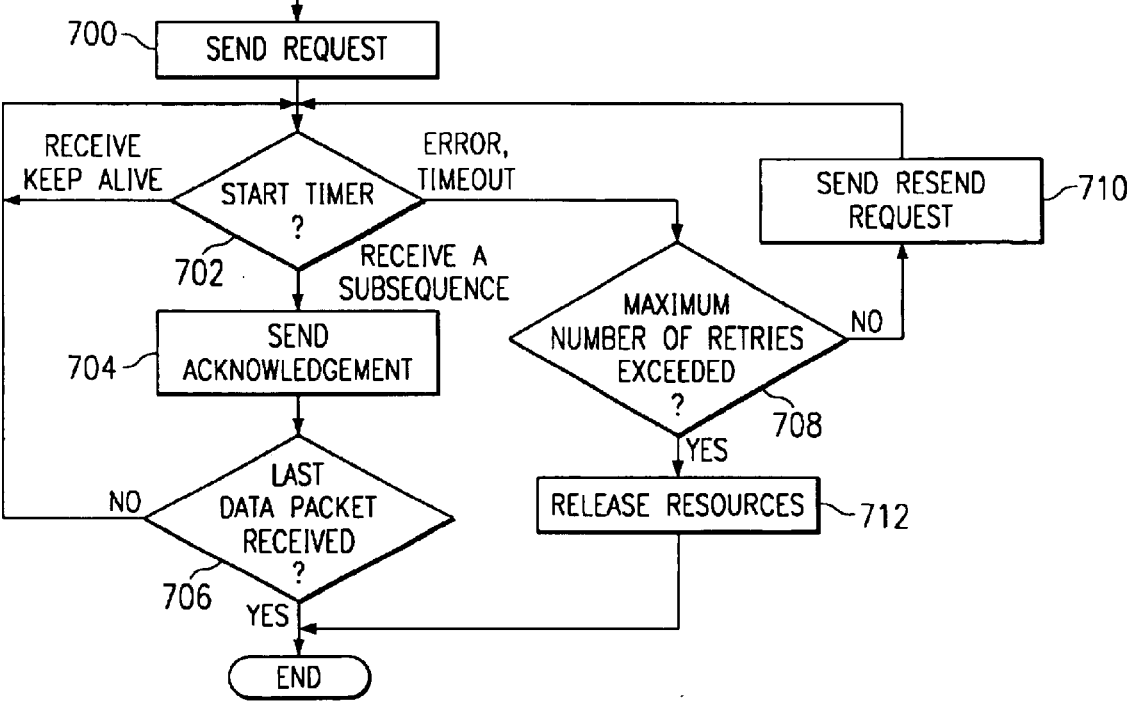
FIG. 7 is a flowchart of a process used for requesting and receiving data in accordance with a preferred embodiment of the present invention.
Figure 8:
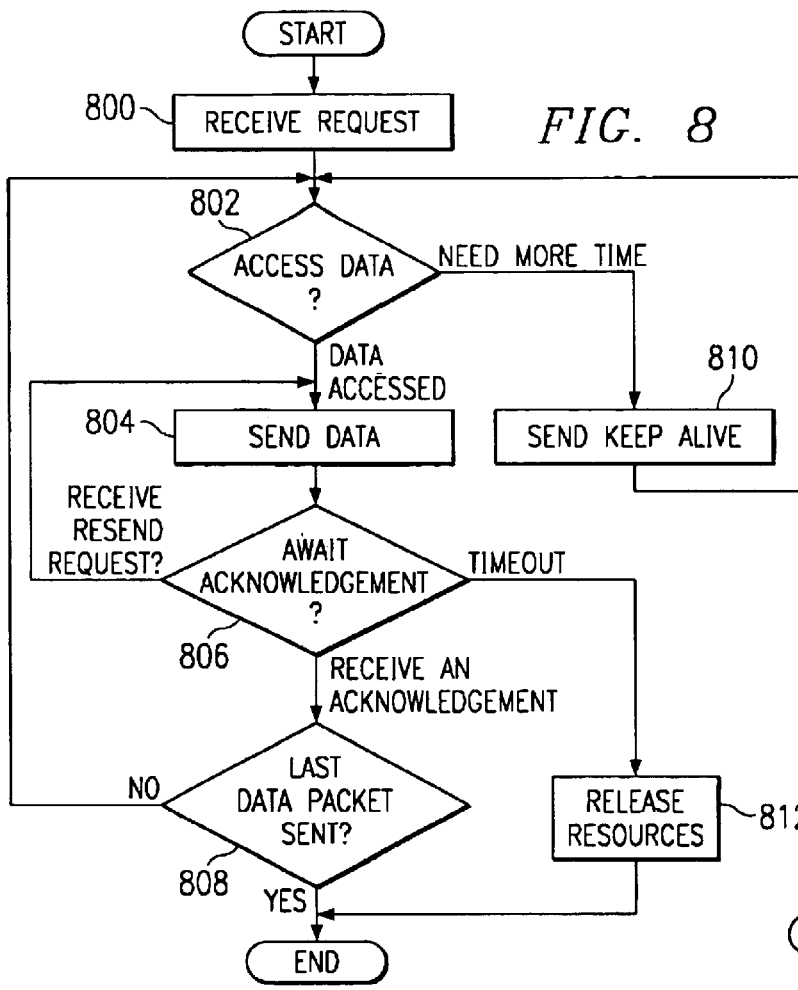
FIG. 8 is a flowchart of a process used for processing a request for data in accordance with a preferred embodiment of the present invention.
Figure 9:
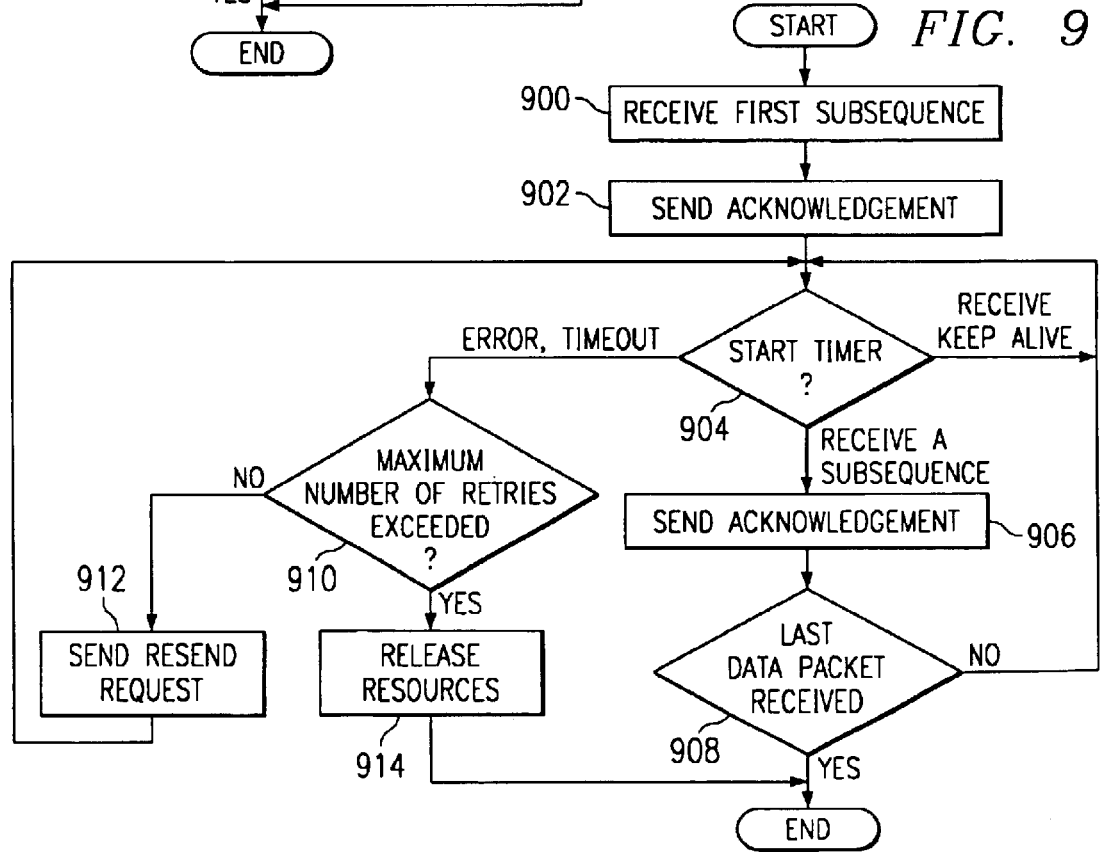
FIG. 9 is a flowchart of a process used for receiving data from a sender without having sent a prior request for the data in accordance with a preferred embodiment of the present invention.
Figure 10:
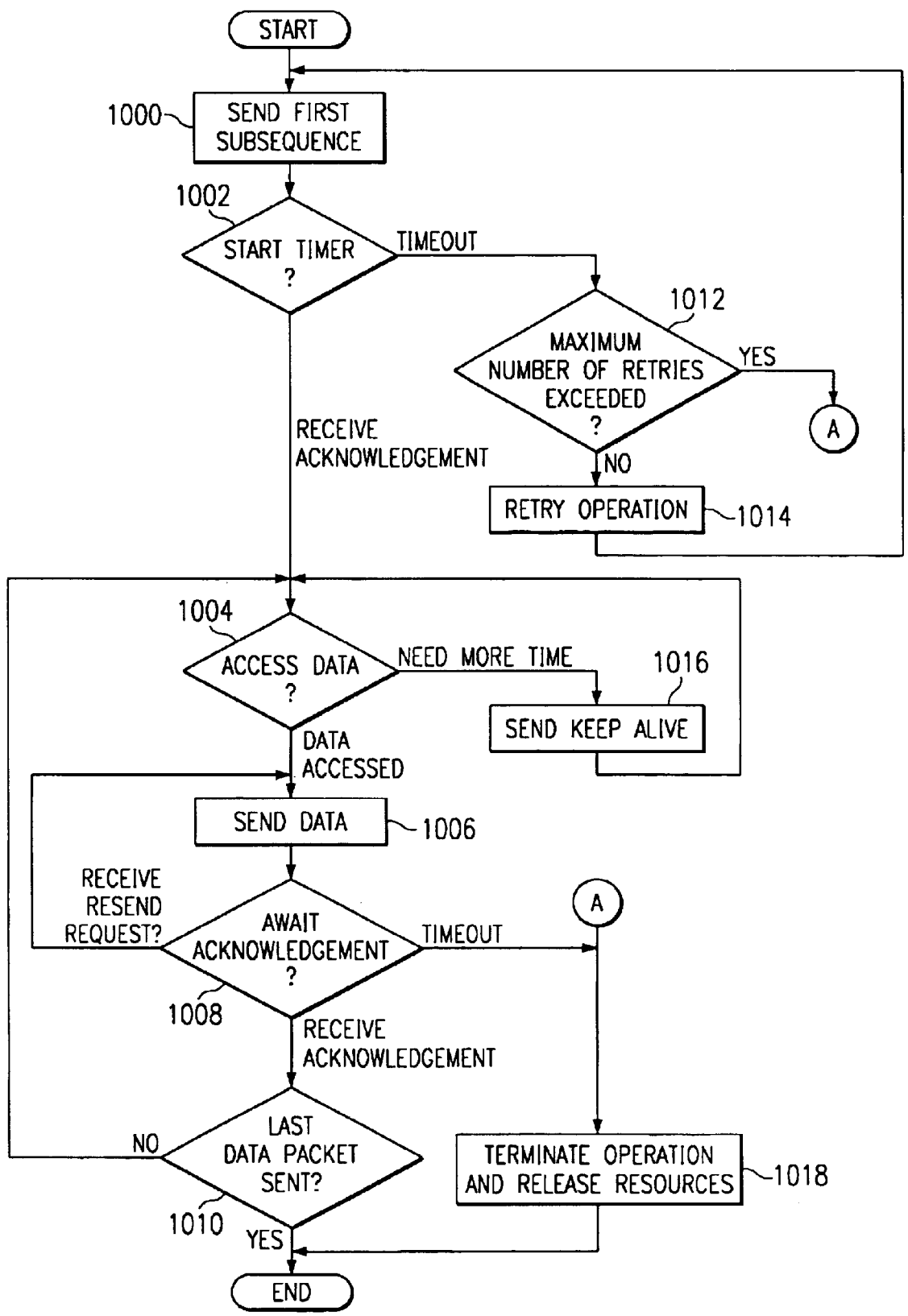
FIG. 10 is a flowchart of a process used for sending data without having received a prior request for data in accordance with a preferred embodiment of the present invention.

FIGS. 7 and 8 illustrate processes in a protocol involving a multipacket request, which is sent in response to a request for data. FIGS. 9 and 10 illustrate processes in a protocol involving the sending of a multipacket message without having received a prior request.

Turning next to FIG. 7, a flowchart of a process used for requesting and receiving data is depicted in accordance with a preferred embodiment of the present invention. The process illustrated in FIG. 7 may be implemented in a requester.

The process begins by sending a request (step 700). In this request, the requestor includes a window field, which specifies the amount of buffer space or other memory space available for processing a block of data, which may be sent in a subsequence. Next, a timer is started (step 702). Once the timer has started, if a subsequence is received, an acknowledgment is sent (step 704). This acknowledgment acknowledges receipt of the subsequence. A determination is then made as to whether the last data packet for the entire request has been received (step 706). Such an identification may be made by using a fragment flag located in a fragment flag field, such as fragment flag field 606 in FIG. 6. If the last data packet has been received, the process terminates.

With reference again to step 702, once the timer has started, if a timeout or an error occurs, a determination is made as to whether a maximum number of retries has been exceeded (step 708). If a maximum number of allowed retries has not been exceeded, a resend request is sent (step 710) with the process returning to step 702. A timeout occurs if a timer expires. An error may occur if the data packet is improperly received or contains errors after error checking. If the maximum number of allowed retries has been exceeded, resources allocated to the operation are released (step 712) with the process terminating thereafter.

Once the timer has started, if a keep alive response is received, the process returns to step 702. In these examples, the keep alive response is received from the responder in case additional time is needed to transfer data to the requester.

With reference again to step 706, if the last data packet has not been received, the process returns to step 702.

Turning next to FIG. 8, a flowchart of a process used for processing a request for data is depicted in accordance with a preferred embodiment of the present invention. The process illustrated in FIG. 8 may be implemented in a responder, in these examples.

The process begins by receiving a request from a requestor (step 800). Next, data is accessed (step 802). This data is data corresponding to the request. The amount of data accessed is equal to the length specified in the window field of the request. Then, that data is sent (step 804). The data sent in step 804 is sent in a subsequence that contains data in the amount up to the amount of space as being available by the requestor as specified in the window field. Further, if the data is for a last data packet to be sent to the user, then a fragment flag is set to indicate that the data packet is a last data packet. Next, the process awaits acknowledgment from requestor (step 806). If an acknowledgment is received, a determination is made as to whether the last data packet has been sent (step 808). If the last data packet has been sent, the process terminates.

With reference again to step 802, if more time is needed to access data, a keep alive is sent (step 810) with the process returning to step 802.

With reference again to step 806, if a resend request is received while awaiting acknowledgment, the process returns to step 804. This resend request may be received in response to an error in the data received by the requestor. If a timeout is received while awaiting acknowledgment, resources are released (step 812) with the process terminating thereafter.

Turning next to FIG. 9, a flowchart of a process used for receiving data from a sender to which a previous request has not been sent is depicted in accordance with a preferred embodiment of the present invention.

The process begins by receiving first subsequence (step 900). This first subsequence contains the default amount of data and contains information specifying the entire amount of data to be sent for the send operation. Next, an acknowledgment is sent to the sender (step 902). A timer is started (step 904). In step 904, if an entire subsequence is received, an acknowledgment is sent back to the sender (step 906). A determination is then made as to whether the last data packet for the entire send operation has been received (step 908). If the last data packet for the entire send operation has been received, the process terminates. This data packet is the final data packet of the final subsequence of data packets.

With reference again to step 904, if a keep alive is received, the process returns to step 904. If an error or timeout occurs, a determination is made as to whether the maximum number of retries has been exceeded (step 910). If the maximum number of retries has not been exceeded, a resend request is sent to the sender (step 912) with the process returning to step 904. If in step 910, the maximum number of retries has been exceeded, all resources allocated to the operation are released (step 914) and the process terminates. With reference again to step 908, if the last data packet has not been received, the process returns to step 904.

Turning next to FIG. 10, a flowchart of a process used for receiving data for which a previous request has not been sent is depicted in accordance with a preferred embodiment of the present invention.

The process begins by the sender sending a first subsequence (step 1000). This subsequence contains a default amount of data. Next, a timer is started to time the receipt of an acknowledgment (step 1002). If an acknowledgment is received, additional data is accessed (step 1004). The amount of data accessed is equal to the value specified in the window parameter field of the acknowledgment packet. If data is accessed within a set amount of time, the data is sent (step 1006) and the process awaits receipt of an acknowledgment (step 1008). The data is sent in a subsequence in which the amount of data within the subsequence is less than or equal to the memory or buffer space available at the recipient, as indicated in the window parameter field of the first acknowledgment packet received from the recipient. If an acknowledgment is received for the data sent, a determination is made as to whether the last packet has been sent (step 1010). If the last packet has been sent, the process terminates.

With reference again to step 1002, if a timeout occurs, a determination is made as to whether a maximum number of retries has been exceeded (step 1012). If a maximum number of retries has not been exceeded, the operation is retried (step 1014) with the process then returning to step 1000. If the maximum number of allowed retries has been exceeded, the process terminates and all resources allocated to the operation are released.

With reference again to step 1004, if more time is needed to access data, a keep alive response is sent to the recipient (step 1016) with the process returning to step 1004.

With reference again to step 1008, if a timeout occurs before either an acknowledgment or resend-request is received, the operation terminated and resources are released at the sender (step 1018). The process also proceeds to step 1018 if the maximum number of retries has been exceeded in step 1012.

With reference again to step 1010, if the last data packet has not been sent, the process returns to step 1004.

Thus, the present invention provides a method, apparatus, and computer implemented instructions for transferring data. This mechanism provides for reliable transfers using MADs. Data is sent in amounts not exceeding the memory space available for processing the data at the recipient. Additional data is sent when an acknowledgment is received that the data has been processed. In this manner, data responsive to a request is sent in a subsequence consisting multiple MADs rather than in a single MAD.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for transferring data, the method comprising:

sending, from a requester, a request for particular data to a responder, the request including an identification of a particular amount of available processing space at the requester, said particular amount of available space capable of holding a particular amount of data;

dividing, by said responder, said particular data into a plurality of separate distinct groups of data packets, each group of said plurality of groups of data packets capable of transferring no more than said particular amount of data;

receiving, in response to said request, one of said plurality of groups of data packets each time the particular amount of available processing space is free, wherein data within each one of said plurality of groups of data packets fits within the particular amount of available processing space.

2. The method of claim 1 further comprising:
reassembling data within the data packets into a correct order.

3. The method of claim 2, wherein each data packet within the plurality of groups of data packets includes a segment number and wherein the data is reassembled using the segment number.

4. The method of claim 1, wherein the data packets are management datagrams.

5. The method of claim 1, further comprising an additional group of data packets that has an amount of data less than the amount of available processing space.

6. The method of claim 1, wherein a particular data packet within one of said plurality of groups includes a fragment flag indicating whether the particular packet is a first data packet or a last data packet of a data transfer operation.

7. The method of claim 1, wherein a particular data packet is a last data packet within the plurality of groups of data packets.

8. The method of claim 1, wherein each group within the plurality of groups of data packets has a different amount of data.

9. The method of claim 1, wherein the data packets includes a segment number.

10. The method of claim 1, wherein the amount of available space is a buffer in the data processing system.

11. The method of claim 1, wherein the amount of available processing space is a buffer allocated within a memory in the data processing system.

12. A data processing system for transferring data, the data processing system comprising:
sending means for sending a request from a requestor for particular data to a responder, the request including an identification of a particular amount of available processing space at the requestor, said particular amount of available space capable of holding a particular amount of data;
said responder for dividing said particular data into a plurality of separate distinct groups of data packets, each group of said plurality of groups of data packets capable of transferring no more than said particular amount of data;
receiving means for receiving, in response to said request, one of said plurality of groups of data packets each time the particular amount of available processing space is free, wherein data within each one of said plurality of groups of data packets fits within the particular amount of available processing space.

13. The data processing system of claim 12, further comprising:
reassembling means for reassembling data within the data packets into a correct order.

14. The data processing system of claim 13, wherein each data packet within the plurality of groups of subsequences of data packets includes a segment number and wherein the data is reassembled using the segment number.

15. The data processing system of claim 12, wherein the data packets are management datagrams.

16. The data processing system of claim 12, further comprising an additional group of data packets that has an amount of data less than the amount of available processing space.

17. The data processing system of claim 12, wherein a particular data packet in one of said plurality of groups includes a fragment flag indicating whether the particular packet is first data packet or last data packet of a data transfer operation.

18. The data processing system of claim 12, wherein the particular data packet is a last data packet within the plurality of groups of data packets.

19. The data processing system of claim 12, wherein each group within the plurality of groups of data packets has a different amount of data.

20. The data processing system of claim 12, wherein the data packets includes a segment number.

21. The data processing system of claim 12, wherein the amount of available space is a buffer in the data processing system.

22. The data processing system of claim 12, wherein the amount of available processing space is a buffer allocated within a memory in the data processing system.

23. A data processing system comprising:
a bus system;
a communications unit connected to the bus, wherein data is sent and received using the communications unit;
a memory connected to the bun system, wherein a set of institutions are located in the memory; and
a processor unit connected to the bun system, wherein the processor unit executes the set of instructions to send, from a requestor, a request for particular data to a responder, the request including an identification of a particular amount of available processing space at the requestor, said particular amount of available space capable of holding a particular amount of data; divide, by said responder, said particular data into a plurality of separate distinct groups of data packets, each group of said plurality of groups of data packets capable of transferring no more than said particular amount of data; receive, in response to said request, one of said plurality of groups of data packets each time the particular amount of available processing space is free, wherein data within each one of said plurality of groups of data packets fits within the particular amount of available processing space.

24. The data processing system of claim 23, wherein the bus system includes a primary bus and a secondary bus.

25. The data processing system of claim 23, wherein the processor unit includes a single processor.

26. The data processing system of claim 23, wherein the processor unit includes a plurality of processors.

27. The data processing system claim 23, wherein the communications unit is an Ethernet adapter.

28. A data processing system comprising:
a bus system;
a communications unit connected to the bus, wherein data is sent and received using the communications unit;
a memory connected to the bus system, wherein a set of instructions are located in the memory; and
a processor unit connected to the bus system, wherein the processor unit executes the set of instructions to receive a request for particular data from a requestor, the request includes an identification of a particular amount of available space in the requestor, said particular amount of available space capable of holding a particular amount of data; identify data using the request divide the data into a plurality of separate distinct groups of data packets, each group of said plurality of groups of data rackets capable of transferring no more than said particular amount of data; and send one of the plurality of groups of data packets to the requestor each time said particular amount of space becomes free.

29. A method in a data processing system for transferring data, the method comprising:

receiving a request for particular from a requestor, the request including an identification of a particular amount of available space in the requestor, said particular amount of available space capable of holding a particular amount of data;

identifying data using the request;

dividing the data into a plurality of separate distinct groups of data packets, each group of said plurality of groups of data packets capable of transferring no more than said particular amount of data; and seuding one the plurality of groups of data packets to the requestor each time the particular amount of space becomes free.

30. The method of claim 29, wherein a first data packet and a last data packet within the plurality of groups of data packets includes a payload length.

31. The method of claim 29, wherein a data packet within the plurality of groups of data packets includes a fragment flag to indicate whether the data packet is a first data packet or a last data packet to be sent for a data transfer operation.

32. The method of claim 29, wherein the sending step comprises:

sending an unsent group of data packets within the plurality of groups of data packets to the requestor;

monitoring for a reply indicating that the amount of available space is free at the requestor; and responsive to another unsent group of data packets being present within the plurality of data packets and detecting the reply, repeating the sending and monitoring steps.

33. A data processing system for transferring data, the data processing system comprising:

receiving means for receiving a request for particular data from a requestor, the request including an identification of a particular amount of available space at the requestor, said particular amount of available space capable of holding a particular amount of data;

identifying means for identifying data using the response;

dividing means for dividing the data into a plurality of separate distinct groups of data packets, each group of said plurality of groups of data packets capable of transferring no more than said particular amount of data and;

sending means for sending one or the plurality of groups of data packets to the requestor each time the particular amount of space becomes free.

34. The data processing system of claim 33, wherein a first data packet and a last data packet within the plurality of groups of data packets includes a payload length.

35. The data processing system of claim 33, wherein a data packet within the plurality of groups of data packets includes a fragment flag to indicate whether the data packet is a first data packet or a last data packet to be sent for a data transfer operation.

36. The data processing system of claim 33, wherein the sending step comprises:

sending means for sending an unsent data packet within the plurality of data packets to the requestor;

monitoring means for monitoring for a reply indicating that the amount of available space is free at the requestor; and repeating means, responsive to another unsent data packet being present within the plurality of data packets and detecting the reply, for repeating initiation of the sending means and monitoring means.

37. A computer program product in a computer readable medium for use in transferring data in a data processing system, the computer program product comprising:

instructions for sending a request from a requestor for particular data to a responder, the request including an identification of a particular amount of available processing space at the requestor, said particular amount of available space capable of holding a particular amount of data;

instructions for dividing, by said responder, said particular data into a plurality of separate distinct groups of data packets, each group of said plurality of groups of data packets capable of transferring, no more than said particular amount of data;

instructions for receiving, in response to said request, one of said plurality of groups of data packets each time the particular amount of available processing space is free, wherein data within each one of said plurality of groups of data packets fits within the particular amount of available processing space.

38. A computer program product in a computer readable medium for transferring data in a data processing system, the computer program product comprising:

first instructions for receiving a request for particular data from a requestor, the request including an identification of a particular amount of available space in the requestor, said particular amount of available space capable of holding a particular amount of data;

second instructions for identifying data using the response;

third instructions for dividing the data into a plurality of groups of data packets, each group of said plurality of separate distinct groups of data packets capable of transferring no more than said particular amount of data; and fourth instructions for sending one the plurality of groups of data packets to the requestor each time said particular amount of space becomes free.

* * * * *

UNITED STATES PATENT AND TRADEMARK OFFICE
CERTIFICATE OF CORRECTION

| | | |
|---|---|---|
| PATENT NO. | : 6,898,638 B2 | |
| APPLICATION NO. | : 09/758737 | |
| DATED | : May 24, 2005 | |
| INVENTOR(S) | : Frazier et al. | |

It is certified that error appears in the above-identified patent and that said Letters Patent is hereby corrected as shown below:

On Title Page, col. 2

Item (57) Abstract, line 2: after "sent by a" delete "requester" and insert --requestor--.

On Title Page col. 2

Item (57) Abstract, line 7: after "transfer to the" delete "requester" and insert --requestor--.

On Title Page col. 2

Item (57) Abstract, line 12: after "space at the" delete "requester" and insert --requestor--.

Col. 14, line 19: after "connected to the" delete "bun" and insert --bus--.

Col. 14, line 20: before "are located" delete "institutions" and insert --instructions--.

Col. 14, line 21: after "connected to the" delete "bun" and insert --bus--.

Col. 14, line 58: after "request" insert --:--.

Col. 14, line 61: after "data" delete "rackets" and insert --packets--.

Col. 15, line 1: after "particular" insert --data--.

Col. 15, line 11: before "the plurality" delete "seuding one" and insert --sending one of--.

Col. 15, line 44: after "one" delete "or" and insert --of--.

Col. 16, line 26: after "transferring" delete ",".

UNITED STATES PATENT AND TRADEMARK OFFICE
CERTIFICATE OF CORRECTION

PATENT NO.       : 6,898,638 B2
APPLICATION NO.  : 09/758737
DATED            : May 24, 2005
INVENTOR(S)      : Frazier et al.

It is certified that error appears in the above-identified patent and that said Letters Patent is hereby corrected as shown below:

Col. 16, line 49: after "one" insert --of--.

Signed and Sealed this

Twenty-second Day of August, 2006

JON W. DUDAS
*Director of the United States Patent and Trademark Office*